April 14, 1959     S. B. MURPHREY     2,881,712
AUTOMATIC STEERING DEVICE FOR VEHICLES
Filed April 10, 1957
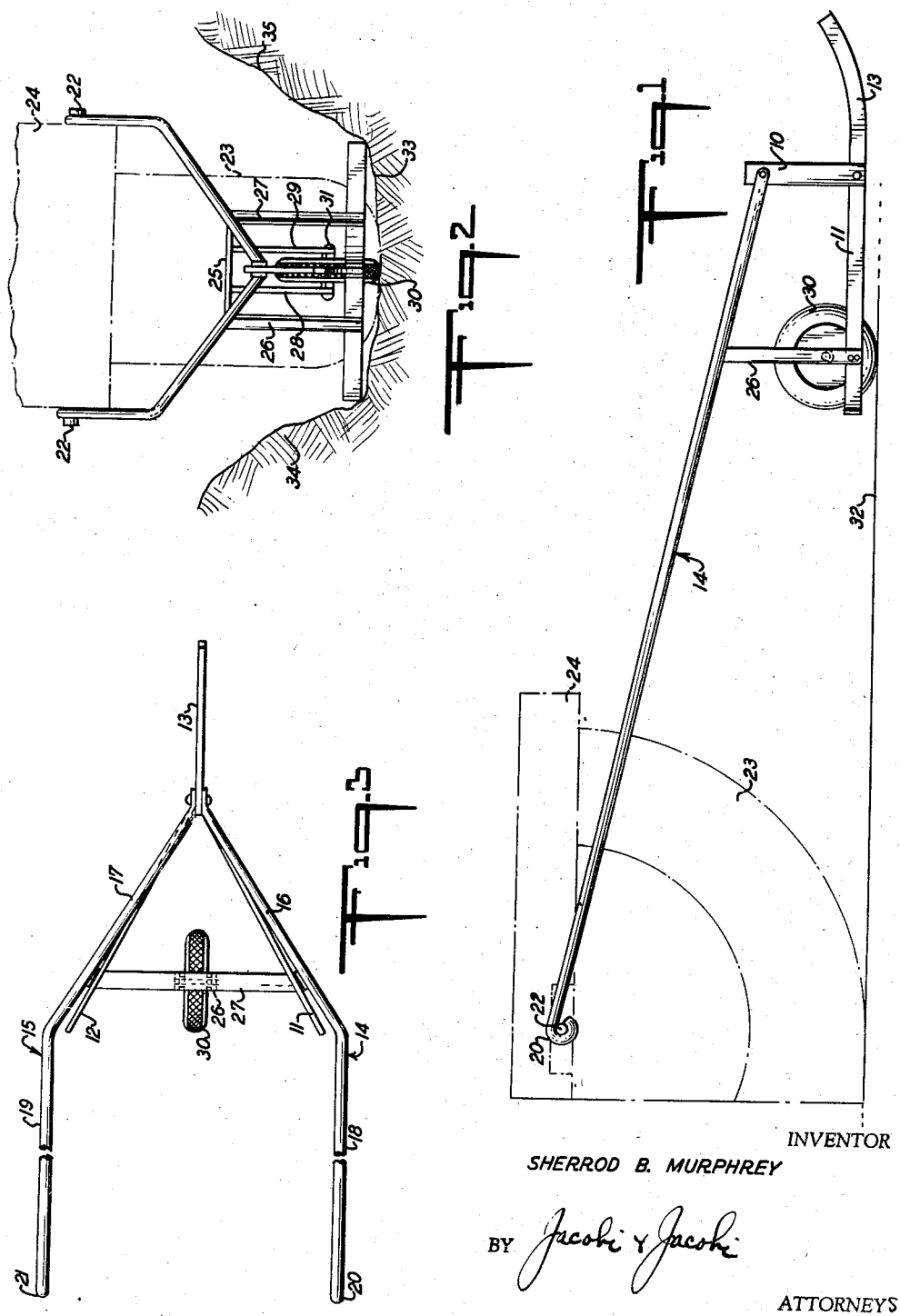
INVENTOR
SHERROD B. MURPHREY
BY *Jacobi y Jacobi*
ATTORNEYS

2,881,712
AUTOMATIC STEERING DEVICE FOR VEHICLES

Sherrod Bellmont Murphrey, Farmville, N.C.

Application April 10, 1957, Serial No. 652,021

7 Claims. (Cl. 104—244.1)

This invention relates to vehicles and more particularly to an automatic steering device which may be attached to vehicles of the type commonly utilized in agriculture and is specifically designed to be utilized on tobacco harvesters, although the invention may be applied to vehicles of similar description and use.

In the harvesting of various crops, such as tobacco, it is common practice for the harvesting apparatus which comprises a vehicle having a steerable front wheel to travel down the rows of tobacco or other crops and heretofore it has been necessary for the operator of the vehicle to continuously steer the same in order to maintain a course in accordance with the furrow between the rows of tobacco or other crops. Since various manual manipulations are necessary in the harvesting of tobacco or other crops, even though a harvesting machine may be utilized, the requirement for steering the vehicle substantially prevents the operator from performing any of the harvesting operations and consequently necessitates the use of an additional man. Accordingly, it would be extremely advantageous if the operator of the vehicle could be freed from his duties of steering the same in order that he might perform at least a portion of the manual operations necessary during harvesting and even though it were necessary for the operator to steer the vehicle at the ends of the rows of tobacco or other crops, such would not be any drawback, since, at this time, the manual harvesting operations are not required.

It is accordingly an object of the invention to provide an automatic steering device which may be conveniently attached to existing vehicles, such as tobacco harvesters for automatically guiding and directing the same along the furrow between the rows of tobacco or other crops in such a manner that the vehicle will automatically follow the course of such furrow.

A further object of the invention is the provision of an automatic steering device for vehicles, such as tobacco harvesters of similar agricultural machinery which may be conveniently and economically manufactured from readily available materials and which may be applied to or removed from existing vehicles of the type mentioned, without necessitating any modifications or changes in such vehicles.

A still further object of the invention is the provision of an automatic steering device to be applied to tobacco harvesters or similar vehicles and which will operate to automatically steer or guide such vehicle along a furrow in the earth without materially adding to the power required to move the vehicle.

Another object of the invention is the provision of an automatic steering device for attachment to vehicles, such as tobacco harvesters or the like and in which the weight of such steering device is entirely carried by a supporting wheel rotatably mounted thereon in order to reduce to a minimum the power required to move the same.

Further objects and advantages of the invention will be apparent from the following description taken in conjunction with the accompanying drawing wherein:

Fig. 1 is a fragmentary side elevational view of an automatic steering device constructed in accordance with this invention and attached to the steerable front wheel of a vehicle;

Fig. 2 a fragmentary front elevational view of the steering device of this invention attached to a vehicle and disposed in a furrow in the earth in the position occupied during normal operation; and Fig. 3 a top plan view of the automatic steering device of this invention.

With continued reference to the drawing, there is shown an automatic steering device constructed in accordance with this invention and which may well comprise a generally triangular frame, including a substantially vertical front post 10 to the lower end of which are secured a pair of ground engaging horizontal guide bars 11 and 12 which extend rearwardly and diverge outwardly from the post 10 to provide a substantially V-shaped arrangement with the apex at the forward end of the frame. An upwardly curved forwardly extending ground engaging shoe 13 is secured to the lower end of the post 10 and the purpose and operation of such ground engaging shoe will be later described.

A pair of steering rods 14 and 15 are secured to the post 10 adjacent the upper end thereof and the forward portions 16 and 17 of the rods 14 and 15 extend rearwardly, upwardly and outwardly to form a part of the generally triangular frame. The remaining rearward portions 18 and 19 of the rods 14 and 15 are substantially parallel and terminate in loops or other suitable means 20 and 21 to be pivotally received over an axle 22 which serves to rotatably mount the front ground engaging wheel 23 of the tobacco harvester or other vehicle to which the steering device of this invention is to be attached. While the rods 14 and 15 are shown as attached to the axle 22, obviously the same may if desired, be attached by any suitable means to the housing 24 of the front wheel 23 or to any other suitable part of the vehicle which is mounted, together with the wheel 23 for substantially free pivotal movement about a substantially vertical axis in order to permit steering of the same.

A cross member 25 is secured to the rods 14 and 15 rearwardly of the post 10 and depending from the rods 14 and 15 substantially in alignment with the cross member 25 are side members 26 and 27 which extend downwardly and are secured to the diverging guide bars 11 and 12 adjacent the rear ends thereof. Downwardly extending arms 28 and 29 are secured to the cross member 25 and provide a fork for receiving a frame supporting ground engaging wheel 30 mounted on an axle 31 which in turn is carried by the arms 28 and 29 secured to the cross member 25. It is to be noted, that the frame supporting wheel 30 extends slightly below the guide bars 11 and consequently, serves to support such guide bars slightly above ground level as indicated by the line 32 in Fig. 1.

In operation, the automatic steering device of this invention is attached to the tobacco harvester or other vehicle, as described above and the front wheel 23 of the vehicle is directed into a furrow 33 between the rows of tobacco or other crops and as the wheel 23 moves along the furrow 33, the guide bars 11 and 12 will contact the sides 34 and 35 of the furrow 33 and in the event such furrow is curved or does not follow a straight line, the guide bars 11 and 12 will follow the sidewalls 34 and 35 of the furrow and consequently, through the steering rods 14 and 15 will turn the front wheel 23 of the vehicle about a vertical axis in order to steer the same in a direction to follow the furrow 33, regardless of the course followed thereby. The frame supporting wheel 30 normally supports the steering device above the ground which results in requiring a minimum of power to move the same, but in the event the bottom of the furrow 33 rises sharply in such fashion that the lower end of the post 10 would tend to dig in, the upwardly curved ground engaging shoe 13 will serve to raise the frame of the steering device until such time as the supporting wheel 30 again engages the ground and fully supports the steering device. It is assumed, that at the end of each furrow 33, that the operator of the vehicle will steer the same in such a manner as to properly position the front wheel 23 and the steering device of this invention in the next furrow.

It will be seen that by the above described invention, there has been provided a relatively simple and economical device which may be conveniently attached to tobacco harvesters or similar agricultural apparatus or other vehicles and which will provide for automatic steering of the same during harvesting operations thereby permitting the operator to perform other operations, it only being necessary to manually steer the vehicle at the end of each furrow or row of crops.

It will be obvious to those skilled in the art that various changes may be made in the invention without departing from the spirit and scope thereof and therefore the invention is not limited by that which is shown in the drawing and described in the specification, but only as indicated in the appended claims.

What is claimed is:

1. An automatic steering device for vehicles having a front ground engaging wheel rotatable on a horizontal axle and mounted for free pivotal movement on a substantially vertical axis, said device comprising a generally triangular frame including a substantially vertical front post, a pair of ground engaging horizontal guide bars extending rearwardly and diverging outwardly from the lower end of said post, and upwardly curved ground engaging shoe extending forwardly from the lower end of said post, a pair of steering rods extending rearwardly, upwardly and outwardly from the upper end of said post, the rearmost portions of said rods being substantially parallel and being pivotally secured to said axle on opposite sides of said front wheel, a cross member secured to said rods rearwardly of said post, side members secured to said rods and to said guide bars adjacent the rear ends thereof, a downwardly extending fork fixed to said cross member and a frame supporting wheel rotatably mounted on said fork to support said guide bars and shoe slightly above ground level whereby upon travel of said supporting wheel and said guide bars in and along a furrow, said guide bars will engage the sides of the furrow and steer said front wheel in accordance with the course of the furrow to steer the vehicle along the same.

2. An automatic steering device for vehicles having a front ground engaging wheel rotatable on a horizontal axle and mounted for free pivotal movement on a substantially vertical axis, said device comprising a frame including a substantially vertical front post, a pair of ground engaging horizontal guide bars extending rearwardly and diverging outwardly from the lower end of said post, an upwardly curved ground engaging shoe extending forwardly from the lower end of said post, a pair of steering rods extending rearwardly, upwardly and outwardly from the upper end of said post, the rearmost portions of said rod being substantially parallel and being pivotally secured to said axle on opposite sides of said front wheel, a cross member secured to said rods rearwardly of said post, side members secured to said rods and to said guide bars adjacent the rear ends thereof, a downwardly extending fork fixed to said cross member and a frame supporting wheel rotatably mounted on said fork to support said guide bars and shoe slightly above ground level whereby upon travel of said supporting wheel and said guide bars in and along a furrow, said guide bars will engage the sides of the furrow and steer said front wheel in accordance with the course of the furrow to steer the vehicle along the same.

3. An automatic steering device for vehicles having a front ground engaging wheel rotatable on a horizontal axle and mounted for free pivotal movement on a substantially vertical axis, said device comprising a frame including a substantially vertical front post, a pair of ground engaging horizontal guide bars extending rearwardly and diverging outwardly from the lower end of said post, an upwardly curved ground engagine shoe extending forwardly from the lower end of said post, a pair of steering rods extending rearwardly, upwardly and outwardly from the upper end of said post, the rearmost portions of said rods being pivotally secured to the mounting of said front wheel, a cross member secured to said rods rearwardly of said post, side members secured to said rods and to said guide bars adjacent the rear ends thereof, a downwardly extending fork fixed to said cross member and a frame supporting wheel rotatably mounted on said fork to support said guide bars and shoe slightly above ground level whereby upon travel of said supporting wheel and said guide bars in and along a furrow, said guide bars will engage the sides of the furrow and steer said front wheel in accordance with the course of the furrow to steer the vehicle along the same.

4. An automatic steering device for vehicles having a front ground engaging wheel rotatable on a horizontal axle and mounted for free pivotal movement on a substantially vertical axis, said device comprising a frame including a substantially vertical front post, a pair of ground engaging horizontal guide bars extending rearwardly and diverging outwardly from the lower end of said post, an upwardly curved ground engaging shoe extending forwardly from the lower end of said post, a pair of steering rods extending rearwardly, upwardly and outwardly from the upper end of said post, the rearmost portions of said rods being pivotally secured to the mounting of said front wheel, a cross member secured to said rods rearwardly of said post, side members secured to said rods and to said guide bars adjacent the rear ends thereof and a frame supporting wheel rotatably mounted on said frame to support said guide bars and shoe slightly above ground level whereby upon travel of said supporting wheel and said guide bars in and along a furrow, said guide bars will engage the sides of the furrow and steer said front wheel in accordance with the course of the furrow to steer the vehicle along the same.

5. An automatic steering device for vehicles having a front ground engaging wheel rotatable on a horizontal axle and mounted for free pivotal movement on a substantially vertical axis, said device comprising a frame including a substantially vertical front post, a pair of ground engaging horizontal guide bars extending rearwardly and diverging outwardly from the lower end of said post, a pair of steering rods extending rearwardly, upwardly and outwardly from the upper end of said post, the rearmost portions of said rods being pivotally secured to the mounting of said front wheel, a cross member secured to said rods rearwardly of said post, side members secured to said rods and to said guide bars adjacent the rear ends thereof and a frame supporting wheel rotatably mounted on said frame to support said guide bars slightly above ground level whereby upon travel of said supporting wheel and said guide bars in and along a furrow, said guide bars will engage the sides of the furrow and steer said front wheel in accordance with the course of the furrow to steer the vehicle along the same.

6. An automatic steering device for vehicles having a front ground engaging wheel rotatable on a horizontal axle and mounted for free pivotal movement on a substantially vertical axis, said device comprising a frame including a substantially vertical front post, a pair of ground engaging horizontal guide bars extending rearwardly and diverging outwardly from the lower end of said post, a pair of steering rods extending rearwardly from said post, the rearmost portions of said rods being pivotally secured to the mounting of said front wheel, a cross member secured to said rods rearwardly of said post, side members secured to said rods and to said guide bars adjacent the rear ends thereof and a frame supporting wheel rotatably mounted on said frame to support said guide bars slightly above ground level whereby upon travel of said supporting wheel and said guide bars in and along a furrow, said guide bars will engage the sides of the furrow and steer said front wheel in accordance with the course of the furrow to steer the vehicle along the same.

7. An automatic steering device for vehicles having a front ground engaging wheel rotatable on a horizontal axle and mounted for free pivotal movement on a substantially vertical axis, said device comprising a frame including a substantially vertical front post, a pair of ground engaging horizontal guide bars extending rearwardly and diverging outwardly from the lower end of said post, a pair of steering rods extending rearwardly and being pivotally secured to the mounting of said front wheel, side members secured to said rods and to said guide bars adjacent the rear ends thereof and a frame supporting wheel rotatably mounted on said frame to support said guide bars slightly above ground level whereby upon travel of said supporting wheel and said guide bars in and along a furrow, said guide bars will engage the sides of the furrow and steer said front wheel in accordance with the course of the furrow to steer the vehicle along the same.

References Cited in the file of this patent
UNITED STATES PATENTS

| | | |
|---|---|---|
| 921,004 | Rohan | May 11, 1909 |
| 1,138,590 | Hartsough | May 4, 1915 |
| 1,980,553 | Salisbury | Nov. 13, 1934 |
| 2,811,089 | Blackstone | Oct. 29, 1957 |